United States Patent [19]

Millar

[11] Patent Number: 4,530,079
[45] Date of Patent: Jul. 16, 1985

[54] TRACK FOLLOWING SYSTEM FOR OPTICAL DISC DRIVE

[75] Inventor: Ronald A. Millar, Sunnyvale, Calif.

[73] Assignee: Xerox Corporation, Stamford, Conn.

[21] Appl. No.: 478,008

[22] Filed: Mar. 23, 1983

[51] Int. Cl.³ .......................... G11B 7/00; G11B 21/10
[52] U.S. Cl. ...................................................... 369/44
[58] Field of Search ................. 358/342; 250/201–204; 369/43, 44, 45, 46

[56] References Cited

U.S. PATENT DOCUMENTS

| | | | |
|---|---|---|---|
| 4,232,337 | 11/1980 | Winslow et al. | 369/44 |
| 4,243,850 | 1/1981 | Edwards | 369/46 |
| 4,462,095 | 7/1984 | Chen | 369/44 |

Primary Examiner—Robert L. Richardson
Attorney, Agent, or Firm—Leonard Zalman

[57] ABSTRACT

The synchro-servo zones of the data blocks of an optical disc track are provided with information which will permit the generation of clock synchronization pulses and tracking pulses, with those latter pulses being used with peak detector/sample and hold circuitry of novel design to generate a substantially noise free tracking information servo feedback signal. Specifically, a pair of pulses having respective amplitudes proportional to the displacement of the read/write beam from the center of the track are generated, with the peak amplitudes of those pulses being stored, and then compared to provide, after carrier filtering, a tracking information servo feedback signal which would have an amplitude proportional to the displacement of the read/write beam from the center of the track and a sign or sense indicative of the direction of the displacement. The feedback signal, having the proper corrective sign, could be applied to the tracking adjustment coils of a dual axis optical head or mirror for moving the objective lens or mirror of the optical head so that the read/write beam moves toward the center of the track. A tracking accuracy of less than 0-1 μm has been achieved using this method.

1 Claim, 7 Drawing Figures

TRACK FOLLOWING SYSTEM FOR OPTICAL DISC DRIVE

BACKGROUND OF THE INVENTION

Optical discs must be provided with a way of generating synchronization or clock information and tracking information if data is to be properly recorded and read. Conventionally, tracking information is provided throughout each block of each segment of a data track of an optical disc and the read beam of the optical drive is continuously monitoring the track to provide tracking information on a continuous basis. Continuous generation of information often causes the tracking servo feedback signal to be noisy due to the varying data pattern coexisting with the tracking data, often resulting in tracking errors.

An approach to providing a relatively noise free tracking information servo feedback signal is to provide clock information and tracking information in only a small portion, the synchro-servo zone, of each sector or data block, with the informational data being provided in the remainder of each block. With this approach, clock information and tracking information are provided only periodically and not at the time informational data is being read or recorded, whereby the signals generated are relatively free of noise. The generation of the tracking information servo feedback signal utilized in this approach is the subject of this invention.

SUMMARY OF THE INVENTION

In accordance with the invention, the synchro-servo zones of the data blocks of an optical disc track are provided with information which will permit the generation of clock synchronization pulses and tracking pulses, with those latter pulses being used with peak detector/sample and hold circuity of novel design to generate a substantially noise free tracking information servo feedback signal. Specifically, a pair of pulses having respective amplitudes proportional to the displacement of the read/write beam from the center of the track are generated, with the peak amplitudes of those pulses being stored, and then compared to provide, after carrier filtering, a tracking information servo feedback signal which would have an amplitude proportional to the displacement of the read/write beam from the center of the track and a sign or sense indicative of the direction of the displacement. The feedback signal, having the proper corrective sign, could be applied to the tracking adjustment coils of a dual axis optical head or mirror for moving the objective lens or mirror of the optical head so that the read/write beam moves toward the center of the track. A tracking accuracy of less than 0–1 μm has been achieved using this method.

DETAILED DESCRIPTION OF THE INVENTION

Figure 1:
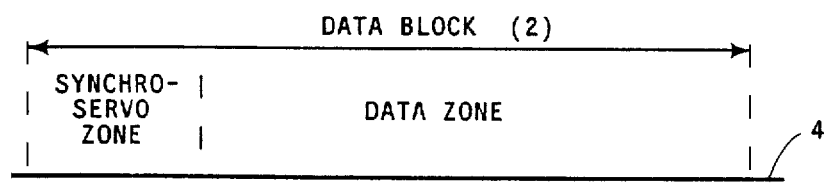
FIG. 1 is a representation of a portion of a track of an optical disc.
Figure 2:
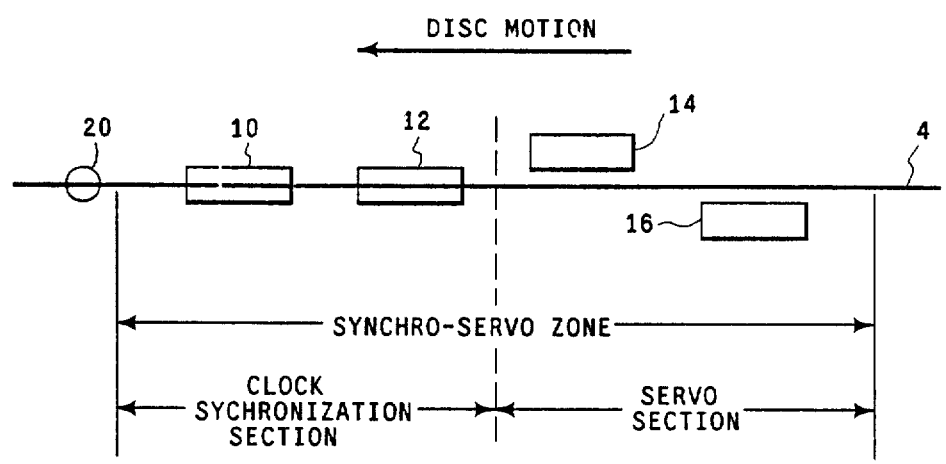
FIGS. 2 and 2A are respectively top and side views of a zone of the portion of the track of FIG. 1.
Figure 2A:

Referring first to FIG. 1, there is shown a data block 2 of an optical disc track 4, which block has a synchro-servo zone and a data zone. Although depicted as being linear, track 4 would in actually be of circular or spiral shape. The optical disc is preferably of the type wherein clock information and tracking information are preformatted during manufacture into the synchro-servo zone. As shown in FIGS. 2 and 2A, the preformatted clock information could be comprised of specially coded bits such as a pair of elevated uniquely displaced regions 10 and 12 in the clock synchronization section of the synchro-servo zone and the preformated tracking information could be comprised of a pair of elevated, displaced regions 14 and 16 in the servo section of the synchro-servo zone. Regions 10, 12, 14 and 16 need not be elevated, they may be depressed, the only requirement of the physical shape or structure of these regions is that they have light reflection properties different than the portions of the flag zone surrounding or adjacent to them. Clock information regions 10 and 12 are displaced from each other and centered along the center of track 4. Tracking information regions 14 and 16 are offset slightly from the center of track 4 (radially offset), with region 14 being displaced a small distance to one side of the track center and region 16 being displaced by the same distance on the other side of track center. Preferably, there is a slight spacing between the regions 14 and 16 along the track direction, but this is not essential. As the synchro-servo zone moves past a stationary laser beam spot 20 with movement of the optical disc, the regions 10 and 12 cause light pulses to be generated, with those pulses being processed in a conventional manner to provide electrical signal pulses for synchronizing data sampling, and additionally, for tracking purposes, a reset pulse which occurs in time subsequent to the regions 14 and 16 reaching laser spot 20 and first and second sampling pulses.

Figure 3:
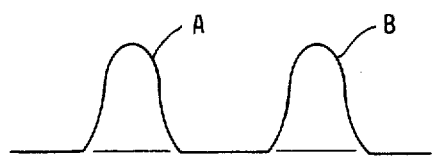
FIGS. 3 and 3A depict voltage pulses produced by the circuit of FIG. 4.
Figure 3A:
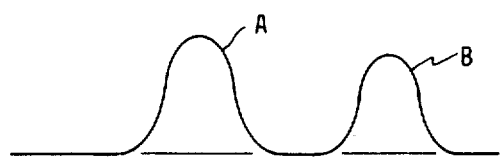

When the laser beam spot 20 is centered over the track 4, passage of regions 14 and 16 past spot 20 will produce light amplitude pulses of equal amplitude, with photodetector processing of those light pulses providing voltage pulses A and B of equal amplitude as shown in FIG. 3. However, when the laser beam spot 20 is displaced from track center, one of the light pulses will be greater than the other, and pulses A and B will be of unequal amplitude, as shown in FIG. 3A. Use is made of the difference in amplitude of the pulses A and B to move the laser beam spot 20 to track center.

Figure 4:
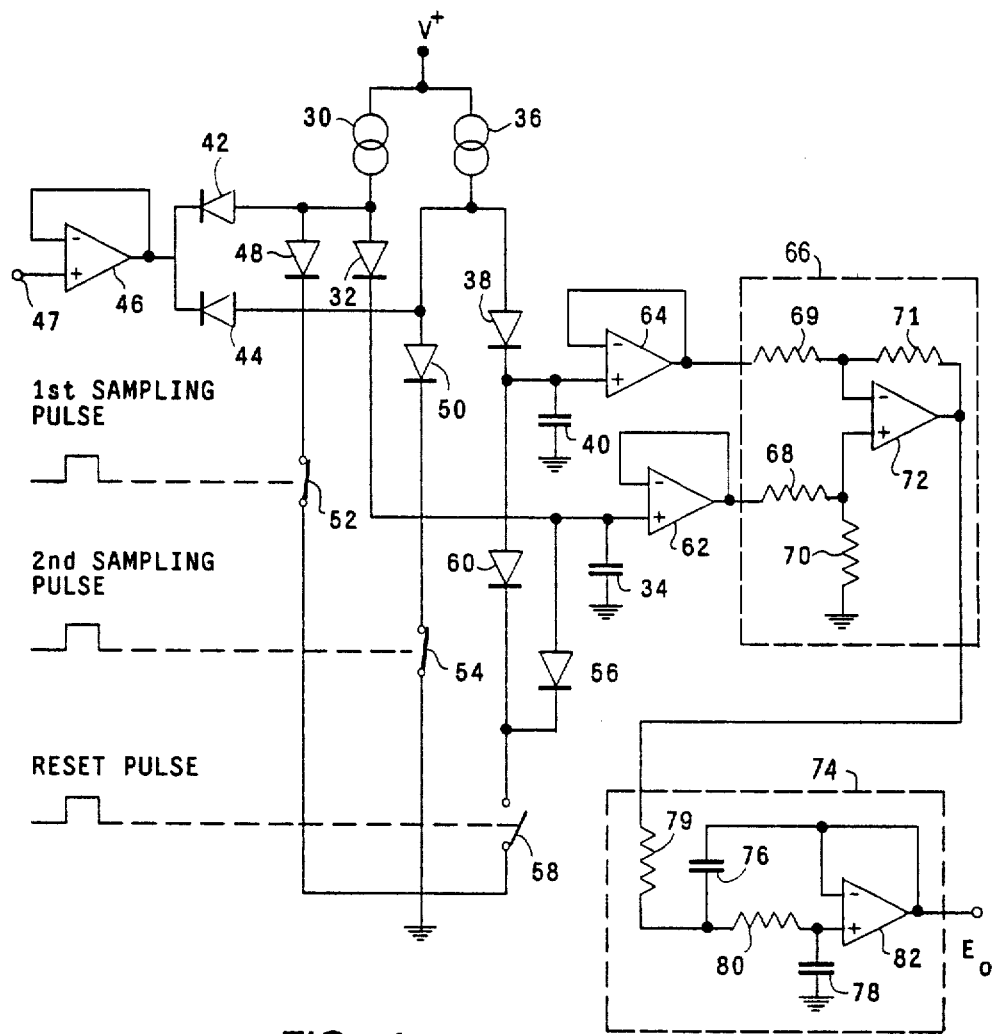
FIG. 4 is a schematic circuit diagram of a tracking error correction circuit.

Referring now to FIG. 4, a first constant charging current source 30 supplied by a voltage V+ is coupled through a diode 32 to a capacitor 34, and a second constant charging current source 36 supplied by voltage V+ is coupled through a diode 38 to a capacitor 40. Current sources 30 and 36 are connected also through diodes 42 and 44, respectively, to the output of a high speed amplifier 46 having a high input impedance and a low output impedance. The tracking information pulses A and B are supplied in sequence to the input 47 of amplifier 46. Diodes 48 and 50 respectively connect current sources 30 and 36 through normally closed switches 52 and 54, respectively, to ground.

The ungrounded side of capacitor 34 is connectable to ground via a diode 56 and a normally open switch 58 and, likewise, the ungrounded side of capacitor 40 is connectable to ground via a diode 60 and switch 58.

The switches 52, 54 and 58 are of the gated type, such as gated transistors which act as gated transistor current sources. The ungrounded sides of capacitors 34 and 40 also are connected respectively to high impedance buffer mplifiers 62 and 64, with the outputs of buffer amplifiers 62 and 64 being connected to the inputs of a difference amplifier 66 including resistors 68, 69, 70 and 71 and operational amplifier 72. The output of difference amplifier 66 is connected to an acitve low pass filter 74 including capacitors 76 and 78, resistors 79 and 80 and amplifier 82.

Operation of the circuit of FIG. 4 for producing a tracking error signal $e_o$ is initiated by closure of the switch 58 upon application thereto of the reset pulse generated using the clock information derived from the previous clock synchronization section. Closure of switch 58 provides a path to ground for the complete discharge of both capacitors 34 and 40. Upon reopening of switch 58 upon passage of the reset pulse, voltage pulse A is supplied to the input 47 of amplifier 46 and simultaneously the first sampling pulse is supplied to switch 52 causing it to open, whereby the capacitor 34 begins to be charged by source 30. When the charge on capacitor 34 reaches the peak voltage of pulse A, diode 32 no longer conducts and current from source 30 is shunted into amplifier 46 via diode 42, whereby the capacitor 34 is charged to the peak voltage of pulse A and retains that charge due to the high input impedance of buffer 62 and the presence of diode 32. Upon termination of the first sampling pulse, switch 52 closes and current from source 30 is shunted to ground through switch 52. Now, voltage pulse B is supplied to the input of amplifier 46 and simultaneously the second sampling pulse is supplied to switch 54 causing it to open, whereby the capacitor 40 begins to be charged by source 36. When the charge on capacitor 40 reaches the peak voltage of pulse B, diode 38 no longer conducts and current from source 36 is shunted into amplifier 46 via diode 44, whereby the capacitor 40 is charged to peak voltage of pulse B and retains that charge due to the high input impedance of buffer 64 and the presence of diode 38. Upon termination of the second sampling pulse, switch 54 closes and current from source 36 is shunted to ground through switch 54.

Buffers 62 and 64 transfer the voltages on capacitors 34 and 40 to the inputs of difference amplifier 66 which provides at its output a carrier modulated signal having an amplitude proportional to the difference in peak amplitudes between voltage pulses A and B and a sense indicative of which voltage pulse has the greater peak amplitude, that is, an amplitude and sense indicative of how far the laser spot 20 is displaced from the center of track 4 and the direction of that displacement. The carrier component of the output signal of amplifier 66 is removed by active low pass filter 74 to provide the desired tracking signal $e_o$. During the reading or writing in the data zone, the tracking signal information $e_o$ is held steady until the next sampling sequence occurs.

Figure 5:
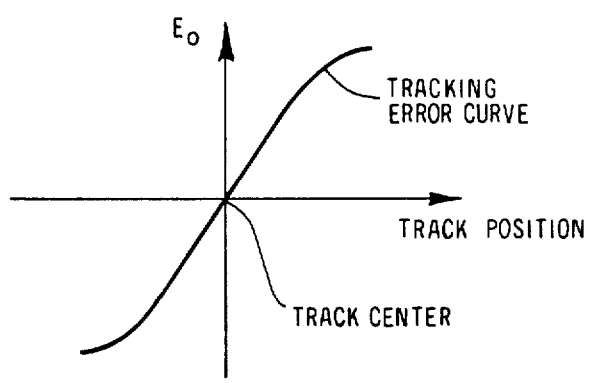
FIG. 5 depicts the tracking error curve of the circuit of FIG. 4.

The relationship of the signal $e_o$ to track position is shown by the track error curve of FIG. 5. The smaller the distance of regions 14 and 16 from track center, that is, the smaller the radial displacement of regions 14 and 16 from track center, the greater the sensitivity of the system, that is, a steeper tracking error curve is provided. A small gap (1 micron) along the track between regions 14 and 16 will provide increased resolution relative to an arrangement where regions 14 and 16 overlap slightly along the track. The signal $e_o$ is supplied in a conventional manner to a conventional closed loop servo system to provide for moving of an objective lens or mirror of the optical disc drive of which the circuit of FIG. 4 is a part to effect movement of spot 20 toward the center of track 4. When such centering is achieved, the difference between the voltage pulses A and B will be zero, as will the signal $e_o$, and no further tracking error movement of spot 20 will occur. Additionally, the voltages stored on capacitors 34 and 40 can be used for Automatic Gain Control purposes, if so desired, to maintain tracking sensitivity at all parts of the disk.

Although the circuit of FIG. 4 can be implemented by various sources of the components disclosed, the following are provided as exemplary; amplifier 46—LH0002, amplifiers 62, 64, 72 and 82— LF 353, diodes IN 916, current sources 30 and 36—transistor current sources using 2N2905 transistors, switches 52, 54 and 58—gated transistor current sources using 2N2222.

I claim:

1. In an optical disc drive which generates, from clocking signals derived from the optical disc utilized with the drive, a reset pulse and a pair of sampling pulses and which generates, from the optical disc utilized with the drive, a pair of tracking signals the peak voltages of which are indicative of the deviation of an optical beam from the center of a track of the optical disc, the improvement comprising a circuit for generating a tracking error correction signal comprising first and second voltage storage means connected to charging current means, first and second normally closed switching devices connected to said charging current means, a high input impedance amplifier receiving said tracking signals and connected to said charging current means and to both of said voltage storage means, said sampling signals being applied to said normally closed switching devices for opening said first switching device when one of said tracking signals is applied to said amplifier whereby said first voltage storage means is charged to the peak voltage of said first tracking signal and for opening said second switching device when the other of said tracking signals is applied to said amplifier whereby said second voltage storge means is charged to the peak voltage of said second tracking signal, first and second high impedance buffer means connected respectfully to said first and second voltage storage means, a difference amplifier having first and second inputs connected respectively to the outputs of said buffer means, and filter means connected to the output of said difference amplifier, the output of said filter means providing a tracking error correction signal having a voltage equal to the difference between the peak voltages of said first and second tracking signals.

* * * * *